United States Patent [19]

Hasegawa et al.

[11] Patent Number: 5,384,354

[45] Date of Patent: Jan. 24, 1995

[54] POLYESTER FILM FOR LAMINATION ONTO METAL SHEET FOR PROCESSING OF SAID SHEET, AND USE THEREOF

[75] Inventors: Kinji Hasegawa, Hachioiji; Takeo Asai; Yoji Murakami, both of Sagamihara, all of Japan

[73] Assignee: Teijin Limited, Osaka, Japan

[21] Appl. No.: 119,100

[22] PCT Filed: Jan. 14, 1993

[86] PCT No.: PCT/JP93/00041

§ 371 Date: Sep. 15, 1993

§ 102(e) Date: Sep. 15, 1993

[87] PCT Pub. No.: WO93/14152

PCT Pub. Date: Jul. 22, 1993

[30] Foreign Application Priority Data

Jan. 16, 1992 [JP] Japan .................... 4-005753
Jan. 16, 1992 [JP] Japan .................... 4-005754
Feb. 12, 1992 [JP] Japan .................... 4-057191

[51] Int. Cl.$^6$ .............. C08L 67/02; C08K 3/26; C08K 3/34; C08K 3/08
[52] U.S. Cl. .................... 524/539; 524/425; 524/440; 524/493; 524/605; 525/444; 525/446; 525/448; 428/458
[58] Field of Search ............... 524/539, 423, 425, 430, 524/437, 493, 497, 577, 588, 440, 605; 525/444, 448, 177, 446; 428/458

[56] References Cited

U.S. PATENT DOCUMENTS

| 4,362,775 | 12/1982 | Yabe et al. | 524/444 |
| 4,761,327 | 8/1988 | Hamono et al. | 524/539 |
| 4,801,640 | 1/1989 | Dallmann et al. | 524/539 |

FOREIGN PATENT DOCUMENTS

| 0121888 | 10/1984 | European Pat. Off. | 525/444 |
| 0278939 | 11/1988 | Japan | 524/539 |

*Primary Examiner*—Peter Szekely
*Attorney, Agent, or Firm*—Sherman and Shalloway

[57] ABSTRACT

The present invention provides a polyester film for processing of a metal sheet, which shows excellent molding-processability when it is laminated onto a metal sheet and the laminated metal sheet is made into a can by deep drawing or the like and which is suitable and useful for production of a metal can having excellent heat resistance, impact resistance and flavor-retaining property.

A polyester film used for lamination onto a metal sheet for processing of said metal sheet, characterized in that the film is formed from 99 to 60% by weight of a copolyester, as the component A, having an ethylene terephthalate unit as the main recurring unit and having a melting point of 210 to 245° C. and 1 to 40% by weight of a polybutylene terephthalate or a copolyester, as the component B, having a butylene terephthalate unit as the main recurring unit and having a melting point of 180 to 223° C., and further comprising a lubricant having an average particle diameter of 2.5 μm or less; and that the film has a plane orientation coefficient of 0.08 to 0.16, a heat shrinkage at 150° C. of 10% or less and a density of less than 1.385 g/cm$^3$: and use thereof.

11 Claims, 2 Drawing Sheets

(A)   (B)

(A)   (B)

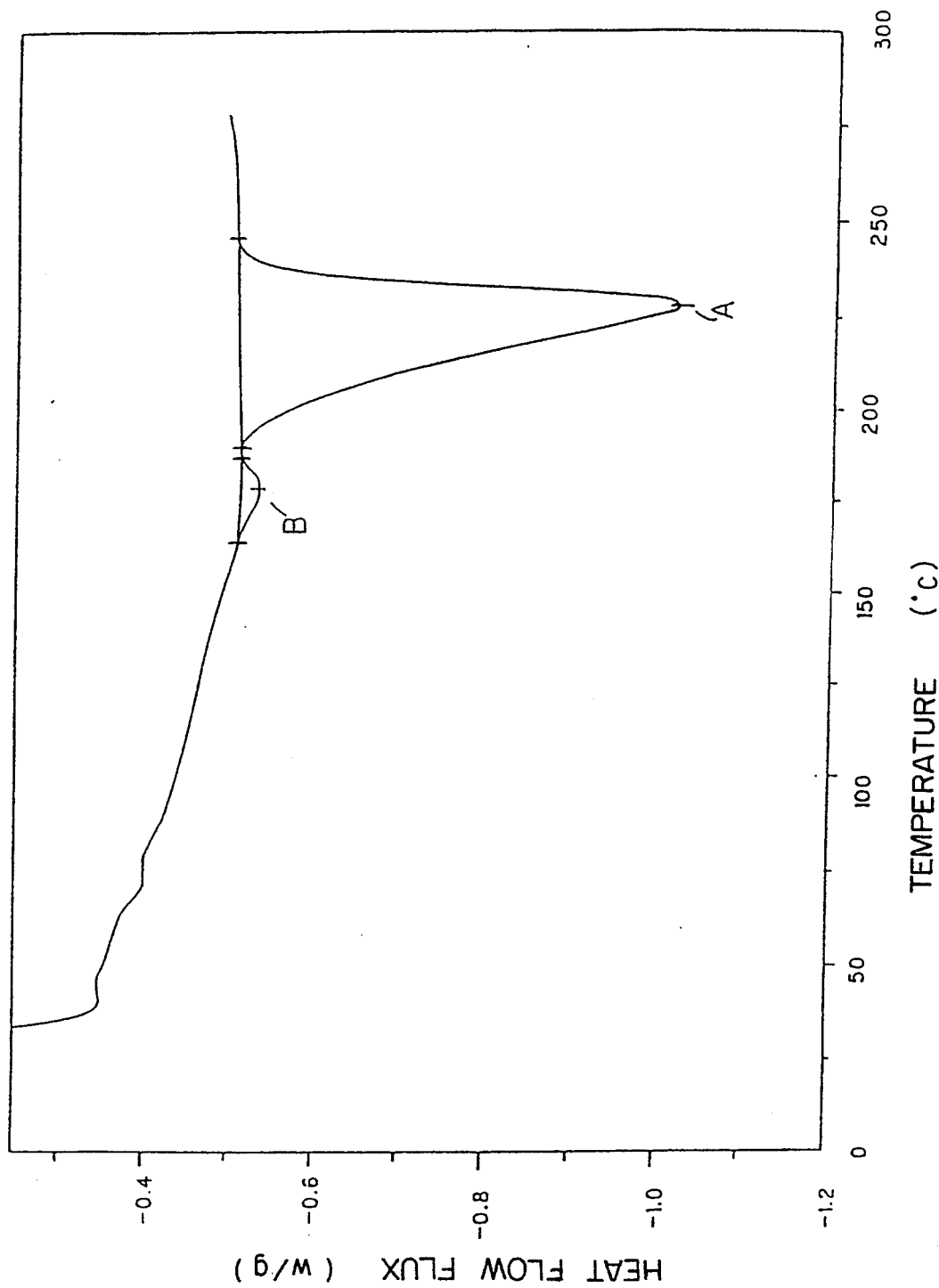

POLYESTER FILM FOR LAMINATION ONTO METAL SHEET FOR PROCESSING OF SAID SHEET, AND USE THEREOF

FIELD OF INDUSTRIAL UTILIZATION

The present invention relates to a polyester film for lamination onto a metal sheet for processing of said metal sheet as well as to use of said film. More particularly, the present invention relates to a polyester film which shows excellent molding-processability when it is laminated onto a metal sheet and the laminated metal sheet is made into a can by deep drawing or the like and which is suitable for production of a metal can (e.g. a can for drinks, a can for foods) having excellent heat resistance, impact resistance and flavor-retaining property, as well as to use of said film.

PRIOR ART

Metal cans are generally coated at the inner and outer surfaces for the prevention of said surfaces from corrosion. Recently, methods of achieving rust prevention without coating of any organic solvent have been developed for the purposes of the simplification of the processes employed, the improvement in sanitary aspect, the elimination of environmental pollution, etc. and, as one of such methods, it has been attempted to coat a metal sheet with a thermoplastic resin film. Namely, a number of researches are under way on a method of laminating a thermoplastic resin film onto a metal sheet of, for example, tinplate, tin-free steel, aluminum or the like and then making the laminated metal sheet into a can by deep drawing or the like. As the thermoplastic resin film, use of polyolefin films and polyamide films has been tried, but these films cannot satisfy all of the molding-processability and the heat resistance and flavor-retaining properties of manufactured can.

On the other hand, a polyester film, particularly a film formed from a polyethylene terephthalate or a copolyethylene terephthalate, is drawing attention because of its balanced properties, and a number of proposals are made of using them as the base film. Such proposals are, for example, as follows.

(1) A method in which a biaxially oriented polyethylene terephthalate film is laminated onto a metal via an adhesive layer of a non-oriented or low-melting polyester and the laminated metal is used as a can material (Japanese Laid-Open Patent Publication No. 10,451/1981 and Japanese Laid-Open Patent Publication No. 192,546/1989).

(2) A method in which an amorphous or very low crystalline aromatic polyester film is laminated onto a metal sheet and the laminated metal sheet is used as the can material (Japanese Laid-Open Patent Publication No. 192,545/1989 and Japanese Laid-Open Patent Publication No. 57,339/1990).

(3) A method in which a biaxially oriented polyethylene terephthalate film which has a low degree of orientation and which has been thermoset is laminated onto a metal sheet and the laminated metal is used as the can material (Japanese Laid-Open Patent Publication No. 22,530/1989).

(4) A method in which a copolyester film having a particular plane orientation coefficient, heat shrinkage and density is laminated onto a metal sheet and the laminated metal sheet is used as the can material (Japanese Laid-Open Patent Publication No. 86,729/1991, Japanese Laid-Open Patent Publication No. 110,124/1991 or EP-A-0415383).

(5) A method in which a copolyester film having a particular refractive index and containing a lubricant of a particular particle diameter is used onto a metal sheet and the laminated metal sheet is used as the can material (EP-A-0472240).

It has been revealed, however, that the conventional techniques according to the above proposals could not provide films having sufficient properties and each has the following problems.

In the above (1), the biaxially oriented polyethylene terephthalate film has excellent heat resistance and flavor-retaining property but is not sufficient in molding-processability. Therefore, when the laminated metal is subjected to can-making processing which inevitably invites large deformation, there occurs the whiting (formation of fine cracks) and rupture of film.

In the above (2), since the film used is an amorphous or very low crystalline aromatic polyester film, it is good in molding-processability. However, the film is inferior in flavor-retaining property and is apt to become brittle during the post treatment such as printing after can-making, retort sterilization and during prolonged storage, and hence, has fear of becoming a film quality which cracks easily by externally exerted impact.

In the above (3), the film is intended to achieve effects in a domain intermediate between the above (1) and (2). The film, however, does not attain to the low orientation applicable to can-making proccesability. Moreover, since the isotropy of the film surface is not guaranteed, molding-processability may become sometimes insufficient in its particular direction(s) of the film in the case where deformation in all directions is caused as in can-making processing (deep drawing).

In the above (4) and (5), when used particularly for a can which receives an internal pressure, the film is liable to crack owing to impacts exerted from outside of the can, thus making it impossible in some cases to provide a can of excellent quality.

DISCLOSURE OF THE INVENTION

The present inventors pursued investigations to develop a polyester film used for can-making processing, particularly for deep drawing, which is free from any of the above-mentioned problems of the prior art. As a result, the present inventors has arrived at the present invention.

That is, according to the studies of the present inventors, there is provided a polyester film for lamination onto a metal sheet for processing of said metal sheet, which is a polyester film formed substantially from a composition comprising a molten mixture of (A) 99 to 60% by weight of a copolyethylene terephthalate having an ethylene terephthalate unit as the main recurring unit and having a melting point of 210° to 245° C. (a component A), and (B) 1 to 40% by weight of a polybutylene terephthalate or a copolybutylene terephthalate having a butylene terephthalate unit as the main recurring unit and having a melting point of 180° to 223° C. (a component B), and a lubricant having an average particle diameter of 2.5 μm or less (a component C), the film (i) having a plane orientation coefficient of 0.08 to 0.16, (ii) having a heat shrinkage at 150° C. of 10% or less, and (iii) having a density of less than 1.385 g/cm³.

BRIEF DESCRIPTION OF THE DRAWINGS

In FIG. 1, (A) is a plan view and (B) is a sectional view.

In FIG. 2 (A) is a plan view and (B) is a sectional view.

FIG. 3 is an example of the endothermic curve of the polyester film prepared in Examples of the present invention, obtained by DSC. In FIG. 3, A is an endothermic peak corresponding to the component A, and B is a top of the endothermic peak corresponding neither to the component A nor to the component B.

Figure 1:
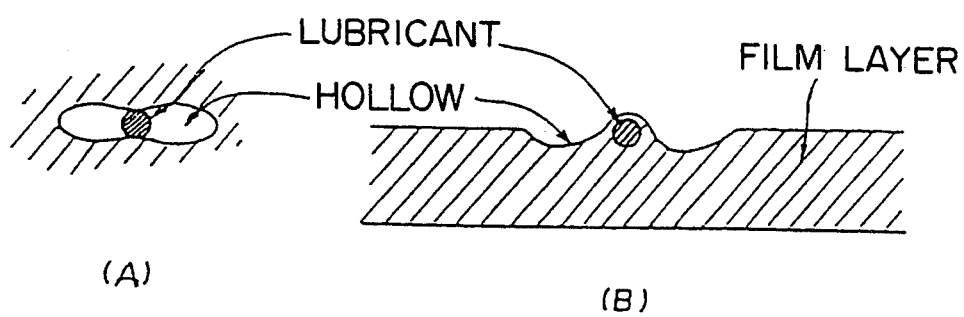
FIG. 1 is a schematic view showing protrusion present on the surface of a polyester film, containing a lubricant as the necleus and having sunk hollow around it.

The polyester film of the present invention and its use will be hereinafter described in more detail.

The polyester film of the present invention is formed substantially from two kinds of polyesters (a component A and a component B) and a lubricant (a component C).

The copolyethylene terephthalate as the component A is a polyester containing an ethylene terephthalate unit

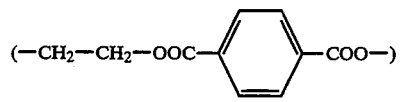

as the main recurring unit. The component(s) constituting the copolymer component(s) other than the ethylene terephthalate unit may be a dibasic acid component or a glycol component, or both. The copolymer components may also be an oxycarboxylic acid.

Examples of the dibasic acid component as the copolymer component include aromatic dibasic acids such as isophthalic acid, phthalic acid, naphthalene-dicarboxylic acid and the like; aliphatic dicarboxylic acids such as adipic acid, azelaic acid, sebacic acid, decanedicarboxylic acid and the like; and alicyclic dicarboxylic acids such as cyclohexanedicarboxylic acid and the like. Examples of the glycol component as the copolymer component are aliphatic diols such as butanediol, hexanediol and the like; and alicyclic diols such as cyclohexanedimethanol and the like. These copolymer components can be used singly or in combination of two or more.

The proportion of the copolymer components differs depending upon their kinds but is such that the resulting component A has a melting point of 210° to 245° C., preferably 215° to 240° C., more preferably 220° to 235° C. When the melting point of a polymer is lower than 210° C., the resulting film has inferior heat resistance and cannot withstand the heat applied during printing after can manufacturing. On the other hand, when the melting point is higher than 245° C., the polymer has too high crystallinity and consequently, the molding-processabillty is impaired.

The copolyester as the component A desirably contains generally an ethylene terephthalate unit in an amount of about 6 to 20 mole %, preferably about 8 to 16 mole % based on the total recurring units, although the amount of said unit differs depending upon the kinds of the copolymer components.

And, the component B in the present invention is a polybutylene terephthalate or a copolybutylene terephthalate containing a butylene terephthalate unit

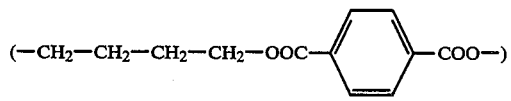

as the main recurring unit. In the latter copolyester, the copolymer components other than the butylene terephthalate unit may be a dibasic acid component or a glycol component, or both. The copolymer components may also be an oxycarboxylic acid.

Examples of the dibasic acid component as the copolymer component include aromatic dibasic acids such as isophthalic acid, phthalic acid, naphthalene-dicarboxylic acid and the like; aliphatic dicarboxylic acids such as adipic acid, azelaic acid, sebacic acid, decanedicarboxylic acid and the like; and alicyclic dicarboxylic acids such as cyclohexanedicarboxylic acid and the like. Examples of the glycol component as the copolymer component are aliphatic diols such as ethylene glycol, hexanediol and the like; and alicyclic diols such as cyclohexanedimethanol and the like. These copolymer components can be used singly or in combination of two or more.

The proportion of the copolymer components differs depending upon their kinds but is such that the resulting component B has a melting point of 180° to 223° C., preferably 200° to 223° C., more preferably 210 to 223° C. When the melting point of a polymer is lower than 180° C., the resulting film has inferior heat resistance and cannot withstand the heat applied during printing after can manufacturing. Incidentally, the polybutylene terephthalate (homopolymer) has a melting point of about 223° C. and it is therefore difficult to obtain a copolybutylene terephthalate having a melting point higher than the above terephthalate.

The copolyester as the component B desirably contains generally a butylene terephthalate unit in an amount of at least about 23 mole %, preferably at least about 15 mole % based on the total recurring units, although the amount of said unit differs depending upon the kinds of the copolymer components.

Herein, the melting points of the two copolyesters of the component A and the component B are measured by a method to determine a melting peak at a temperature elevation rate of 20° C./min, using Du Pont Instruments 910 DSC. In the method, the sample amount is about 20 mg.

The copolyesters as the component A and the polybutylene terephthalate or the copolyester as the component B used in the present invention are not restricted by the production processes. For example, in the production of the copolyethylene terephthalate (component A), there is preferably used a process which comprises subjecting terephthalic acid, ethylene glycol and copolymer component(s) to an esterification reaction and then subjecting the resulting reaction product to a polycondensation reaction to obtain a copolyester, or a process which comprises subjecting dimethyl terephthalate, ethylene glycol and copolymer component(s) to an ester interchange reaction and then subjecting the resulting reaction product to a polycondensation reaction to obtain a copolyester. In the production of the copolyester, it is also possible to add, as necessary, other known additives such as an antioxidant, a heat stabilizer, an ultraviolet absorber and an antistatic agent.

And, the component B can be produced in the same process as for the component A, namely, by using butanediol in place of ethylene glycol and employing the same means.

The polyester film of the present invention comprises polymer components consisting of 99 to 60% by weight of the component A and 1 to 40% by weight of the component B. A film comprising polymer components consisting of less than 1% by weight of the component B and more than 99% by weight of the component A, when used particularly in a can which receives an internal pressure, cracks easily when an external pressure is exerted to the can, and cannot provide a can of excellent quality. On the other hand, a film wherein the proportion of the component B is more than 40% by weight and the proportion of the component A is less than 60% by .weight, has low heat resistance and insufficient impact resistance. Preferably, the proportion of the component A is 95 to 60% by weight and the proportion of the component B is 5 to 40% by weight.

The polyester film of the present invention further contains, as the component C, a lubricant having an average particle diameter of 2.5 μm or less. The lubricant may be an inorganic type or an organic type, while the inorganic type is preferred. The inorganic lubricant is preferably selected, for example, from silica, alumina, titanium dioxide, calcium carbonate, barium sulfate or the like, and the organic lubricant is selected, for example, from crosslinked polystyrene particles, silicone particles or the like. The lubricant, either inorganic or organic, is required to have an average particle diameter of 2.5 μm or less. When the lubricant has an average particle diameter exceeding 2.5 μm and when a film comprising such a lubricant is subjected to deep drawing for can manufacturing or the like, pinholes are liable to occur starting from coarse lubricant particles (e.g. particles of 10 μm or greater) present in a portion deformed by can-making processing such as deep drawing or, in some cases, cause film rupture. Hence, a lubricant having such an average particle diameter is not preferred.

The lubricant preferable from the standpoint of pinhole prevention is a spherical monodisperse lubricant having an average particle diameter of 2.5 μm or less and a particle diameter ratio (long diameter/short diameter) of 1.0 to 1.2. Such a lubricant includes truly spherical silica, truly spherical titanium oxide, truly spherical zirconium and truly spherical silicone particles.

The average particle diameter and particle diameter ratio of a spherical monodisperse lubricant can be calculated by vapor depositing a metal on the surfaces of the particles of said lubricant, observing the images of the metal-coated particles through an electron microscope under the magnification of, for example, 10,000 to 30,000 to determine the long diameter, short diameter and diameter of circle converted from projected area, of each particle, and then applying them to the following equation.

Average particle diameter =
[total of each diameter of circle converted from projected area, of measured particles]/
[number of measured particles]

Particle diameter ratio =
[average long diameter of particles]/
[average short diameter of said particles]

Preferably, the particle of the lubricant has a sharp particle diameter distribution, and a relative standard deviation of particle diameter, indicating the sharpness of particle diameter distribution, of 0.5 or less, preferably 0.3 or less.

The relative standard deviation is calculated using the following equation.

$$\text{Relative standard deviation} = \sqrt{\frac{\sum_{i=1}^{n}(Di - \overline{D})^2}{n}} / \overline{D}$$

wherein $Di$: diameter of circle converted from projected area, of each particle (μm), $\overline{D}$: average of each diameter of circle converted from projected area, of particles, i.e.

$$\left(\frac{\sum_{i=1}^{n} Di}{n}\right)(\mu m)$$

and $n$: number of particles.

The amount of the lubricant (the component C) in the polyester film can be set depending upon the film taking-up property during the film production step. It is generally preferred that the amount added of the lubricant having a large particle diameter is small, while that of the lubricant having a small particle diameter is large. Usually, the lubricant is contained in an amount of about 0.01 to 1.0% by weight, preferably about 0.03 to 0.5% by weight based on the polyester (the total amount of the component A and the component B), although the amount is appropriately determined depending upon the particle diameter, shape, kind, etc. of the lubricant. For example, silica having an average particle diameter of 2.0 μm is preferably used in an amount of 0.05% by weight and titanium dioxide having an average particle diameter of 0.3 μm is preferably used in an amount of 0.3% by weight. The film can be intentionally opacified by using the lubricant in an amount larger than the above range.

The polyester film of the present invention can be produced by melt-mixing the predetermined amounts of the component A and the component B, extruding the mixture into a film form by an ordinary method, and subjecting the film to biaxial stretching and thermosetting. The lubricant, for example, a spherical monodisperse lubricant, may be incorporated to either or both of the component A and the component B during their polymerization step, or may be added during the melt-mixing of the two components.

The polyester film of the present invention is required to have a plane orientation coefficient in the range of 0.08 or higher and 0.16 or lower, preferably in the range of 0.09 or higher and 0.15 or lower, more preferably in the range of 0.10 or higher and 0.14 or lower. When the plane orientation coefficient is less than 0.08, the film may invite problems such as cracking and the like when it is subjected to deep drawing of high drawing ratio.

Therefore, such a plane orientation coefficient is not preferable. On the other hand, when the plane orientation coefficient is more than 0.16, the film undergoes rupture during deep drawing, thus making deep drawing itself impossible.

The plane orientation coefficient is a value defined by the following equation.

Plane orientation coefficient (f)

$$=[(n_x+n_y)/2]-n_z$$

wherein f: plane orientation coefficient, and $n_x$, $n_y$ and $n_z$: refractive indexes of film in transverse, longitudinal and thickness directions, respectively.

The refractive indexes in the above equation are measured as follows.

A polarizing plate analyzer is attached at the ocular side of an Abbe's refractometer, and each of the refractive indexes of a film in said three directions is measured using a monochromatic light, Na D ray. In that case, the mounting liquid is methylene iodide and the measurement temperature is 25° C.

The polyester film of the present invention further has a heat shrinkage at 150° C. of 10% or less, preferably 7% or less more preferably 6%, or less and a density of less than 1.385 g/cm³, preferably 1.380 to 1.350 g/cm³, more preferably 1.375 to 1.355 g/cm³.

The heat shrinkage is obtained by placing marks on two points (at a distance of about 10 cm) on a sample film at room temperature, keeping the film in a circulating hot air oven of 150° C. for 30 minutes, cooling the film to room temperature and measuring the distance of the above two mark points, calculating the difference in distances of the two mark points before and after keeping at 150° C., and making calculation using this difference and the distance of the two mark points before keeping at 150° C. The heat shrinkage is represented by the heat shrinkage in longitudinal direction of film. The density is measured with a density gradient tube.

When the heat shrinkage (at 150° C.) of polyester exceeds 10%, the film, when laminated onto a metal sheet, causes a large dimensional shrinkage and, undesirably, invites drawbacks such as wrinkle formation or the like. A film having a heat shrinkage of 10% or less, preferably 7% or less, particularly preferably 6% or less is almost free from the problem such as wrinkle formation or the like and gives a good result when laminated onto a metal sheet. A film density of more than 1.385 g/cm³ is not preferable, either, because such a film is inferior in deep drawability and causes cracking, breakage or rupture in some cases.

Desirably, the polyester film of the present invention has, besides the above properties, further surface protrusions satisfying the following expression.

$$0.1 \leq Nd/N \leq 0.5$$

wherein N is the number of total protrusions per unit area of the film surface and Nd is the number of protrusions each containing a lubricant as the nucleus and each having a sunk hollow around it, per unit area of the film surface.

The above expression indicates that the number of protrusions present on the film surface, each containing a lubricant as the nucleus and each having a sunk hollow around it is not less than 10% and 50% or less preferably not less than 15% and 45% or less, more preferably not less than 20% and 40% or less, based on the number of total protrusions present on the film surface. The "protrusions each containing a lubricant as the nucleus and each having a sunk hollow around it" (hereinafter sometimes referred to as "protrusions each having a hollow") are formed by the stretching treatment of a film and are different from unevennesses formed, for example, by satin-processing.

When the number of protrusions each having a hollow is less than 10%, the film is liable to undergo rupture during can manufacturing or tends to show inferior resistance to impact cracking after can manufacturing. On the other hand, when the number of protrusions each having a hollow is above 50%, the film is difficult to produce; that is, specks are extraordinarily formed during the primary stretching, terraced specks appear clearly in the film after biaxial stretching, and hence, the uniformity of film quality may be impaired.

Figure 2:
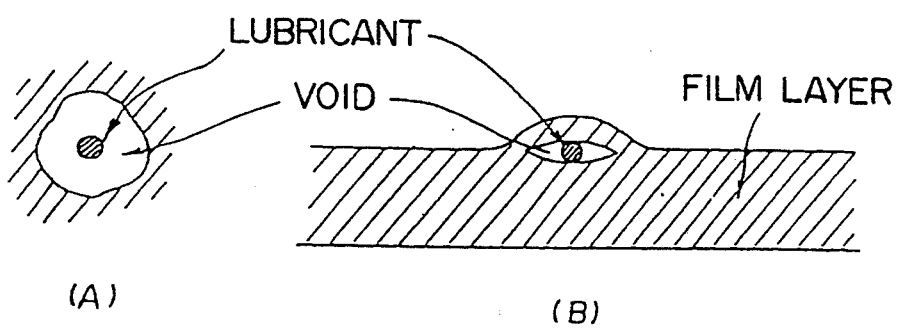
FIG. 2 is a schematic view showing ordinary protrusion present on the surface of a polyester film, containing a lubricant as the nucleus (having no sunk hollow around it).

A schematic view of the protrusions each having a hollow is given in FIG. 1. In FIG. 1, (A) is a plan view and (B) is a sectional view. A schematic view of protrusions having no hollow (ordinary protrusions) is shown in FIG. 2. In FIG. 2, (A) is a plan view and (B) is a sectional view.

For obtaining a polyester film satisfying the above-mentioned requirements of plane orientation coefficient, heat shrinkage (at 150° C.), density and protrusions each having a hollow, there can be used, for example, the following method by biaxial stretching, particularly successive biaxial stretching. However, the polyester film of the present invention is not restricted to a film obtained by the following method so long as the above requirements are satisfied.

First, the component A, component B and component C are mixed at given proportions and melted; the molten is discharged from a die to mold it into a film; the film is immediately rapidly cooled to give a substantially amorphous polyester sheet. Then, this sheet is heated by rolls, infrared rays or the like and stretched longitudinally. At that time, it is preferred to adjust the stretching temperature to a temperature higher, by 40 to 55° C., than the glass transition temperature (Tg) of the component A polyester and to adjust the stretch ratio to 2.5 to 3.5. Preferably, the stretching in transverse direction is initiated at a temperature higher than the Tg by at least 40° C. and is continued with temperature elevation up to a temperature lower, by 70 to 110° C., than the melting point (Tm) of the component A polyester. The stretch ratio in transverse stretching is preferably 2.7 to 3.6. The thermosetting temperature is selected in the range of 150 to 220° C. depending upon the Tm of the component A polyester to control the quality of the film obtained.

In the above film-making conditions, the number of protrusions each having a hollow can be increased by elevating the stretching temperature and lowering the stretch ratio. Simultaneously, by decreasing the orientation, without enlarging the difference of physical properties in the width direction of the biaxially stretched film, a film having excellent processability can be obtained.

In the polyester film of the present invention, the above-mentioned conditions of the following properties:

(i) a plane orientation coefficient,
(ii) a heat shrinkage,
(iii) a density, and (iv) protrusions on film surface are required to be satisfied. The present polyester film can have more superior properties when satisfying the following property requirements (v) to (vii) in addition to the above property requirements:

(v) a refractive index in the thickness direction of the film is 1.505 to 1.545, (vi) refractive indexes in all the plane directions of the film are 1.61 to 1.66, and (vii) a top of the endothermic peak corresponding neither to the component A nor to the component B in DSC curve is present in the range of 150 to 205° C.

The definition of the above requirements (v) to (vii) and the measurement methods therefor are described below.

(v) The present film has a refractive index of 1.505 or more and 1.545 or less, preferably 1.510 or more and 1.540 or less, more preferably 1.510 or more and 1.530 or less in the thickness direction of the film. When the refractive index is lower than 1.505, the film tends to have insufficient molding-processability, while when the refractive index is higher than 1.545 (i.e. the film has an excessively low orientation), the film has a nearly amorphous structure and tends to have insufficient heat resistance.

(vi) The present film has refractive indexes of 1.61 or more and 1.66 or less, preferably 1.615 or more and 1.655 or less in all the plane directions of the film. When a film is subjected to deep drawing or ironing, both of which are often used in can manufacturing, the resulting deformation must be uniform in all the film directions and any part of the film must be able to follow the deformation. In the film plane directions giving a refractive index of less than 1.61, the film has good molding-processability, but its heat resistance begins to decline. In the film plane directions giving a refractive index of more than 1.66, the film has inferior molding-processability and therefore causes whitening during deep drawing, resulting in film rupture. The refractive indexes in the film thickness direction and the film plane directions are measured as follows.

A polarizing sheet analyzer is attached at the ocular side of an Abbe's refractometer, and each of the refractive indexes in said directions is measured using a monochromatic light, i.e. Na D-ray. Methylene iodide is used as the mounting liquid, and the measuring temperature is 25° C.

The measurement of the refractive indexes in the film thickness direction and the film plane directions is conducted about the end portion of a sample cut out symmetrically to the center of the stretching and in a width corresponding to 80% of the total film width, from the released film after the thermosetting.

(vii) The present film gives a top of the endothermic peak corresponding neither to the component A nor to the component B in DSC curve, in the range of 150 to 205° C., preferably 155 to 200° C., more preferably 160 to 195° C. This top of endothermic peak contributes to the stability of film quality after the film has been laminated under heating onto a metal sheet. When the top of the endothermic peak is at a temperature lower than 150° C., an increase in temperature of heat for lamination onto a metal sheet brings about embrittlement at can bottom, while a decrease in said temperature invites film rupture during can-making processing. Therefore, it is impossible to produce a can of good quality by controlling the heat-lamination temperature. When tile top of the peak is at a temperature higher than 205° C., film rupture tends to occur during can-manufacturing.

The measurement of the endothermic curve by DSC is conducted according to the same method and conditions as for the measurement of the melting point of polyester. Namely, said curve is prepared using Du Pont Instruments 910 DSC, at a temperature elevation rate of 20° C./min, and a top of the endothermic peak is examined from the curve. The amount of the film sample is about 20 mg. The relation between the top of the peak (the point B of FIG. 3) and melting point may be understood, for example, from FIG. 3.

The polyester of the present invention satisfying the property requirements (i) to (vii) can be obtained by basically following the above-mentioned methods and requirements. That is, in the biaxially stretching, particularly successive biaxially stretching treatment, stretching and heat treatments are preferably conducted at a longitudinal stretch ratio of 2.5 to 3.6 and a transverse stretch ratio of 2.7 to 3.6 and a thermosetting temperature of 150 to 30° C. More preferably, the longitudinal stretch ratio, transverse stretch ratio and thermosetting temperature satisfying the above-mentioned requirements for refractive index in film thickness direction, distribution of refractive indexes in film surface and the above top of the peak of endothermic curve by DSC are determined beforehand by experiments, and then the biaxial stretching and thermosetting treatments are conducted based thereon. In order to control, in particular, the distribution of refractive indexes (the maximum value and minimum value), there may be employed the methods disclosed in Japanese Laid-Open Patent Publication No. 160,122/1983, Japanese Laid-Open Patent Publication No. 115,812/1984, and Japanese Laid-Open Patent Publication No. 114,028/1984, or there may be employed the following method.

A polyester is melt-extruded into a sheet, the sheet is rapidly cooled to prepare an unstretched film, and the unstretched film is heated by rolls, infrared rays or the like and stretched longitudinally to obtain a longitudinally stretched film. This stretching is preferably conducted by utilizing the peripheral speed difference between two or more rolls. The stretching temperature is preferably a temperature higher than the glass transition temperature (Tg) of the component A polyester, more preferably a temperature higher than the Tg by 20 to 40° C. The stretch ratio differs depending upon the properties of the final film, but is preferably at least 2.5. More preferably, the ratio is not more than 3.6.

The longitudinally stretched film is subsequently subjected to transverse stretching, thermosetting and thermal relaxation treatments in this order to give a biaxially oriented film. These treatments are carried out while running the film to be treated. The transverse stretching is started at a film temperature higher by at least 20° C. than the glass transition temperature (Tg) of the component A polyester and is continued with temperature elevation up to a temperature lower by (120 ~30)° C. than the melting point (Tm) of the component A polyester. The above stretching initiation temperature is preferably (Tg +40)° C. or lower. The stretching maximum temperature is preferably lower by (100 ~40)° C. than the TM.

The temperature elevation in the transverse stretching may be continuous or stepwise (successive) and is usually successive. The successive temperature elevation is carried out, for example, by plurally dividing the transverse stretching zone of a stenter along the film-travelling direction and flowing a heating medium of the predetermined different temperature through each different zone. Too low a transverse stretching initiation temperature is not preferable because it gives rise to film rupture. The stretching maximum temperature of lower than (Tm −120)° C. is not preferable because it increases film heat shrinkage and reduces the uniformity of film properties in film transverse direction. The stretching maximum temperature of higher than (Tm −30)° C. is not preferable, either, because it provides a soft film which is broken by disturbance or the like.

The ratio of transverse stretching differs depending upon the properties of the final film, but is preferably 2.7 or more, preferably 3.0 or more. It is further preferred that this ratio is not more than 3.6.

The transverse stretching is followed by thermosetting. The thermosetting is initiated at a film temperature when the transverse stretching is completed, and is continued while the film is stretched by 2 to 20% in the film transverse direction and the temperature is raised up to a temperature of (Tm −20)° C. or lower. This stretching is generally called "toe-out", and is preferably 5 to 15%. The difference between the temperature at the time of completion of the thermosetting and the temperature at the time of start of the thermosetting is preferably 40° C. or less, more preferably 30° C. or less. This temperature difference may be 1° C. in some case, but is preferably not less than 5° C., more preferably not less than 10° C. Stretching in the thermosetting, of less than 5% is not preferable because the region of the film showing isotropy in the film transverse direction becomes small. On the other hand, the stretching more than 20% is not preferable, either, because not only heat shrinkage in the film transverse direction becomes large, but also tends to cause film rupture.

The thermoset film is once cooled to a temperature which is not higher than the glass transition temperature (Tg) of the component A polyester, and is slitted with a given width at the end portion(s). After separation, the resulting film is subjected, as necessary, to thermal relaxation.

The thermal relaxation is conducted at a temperature of (Tg +30) to (Tg +80)° C. for 0.3 to 20 seconds under a low travelling tension of 4 to 10 kg/cm² without restraining the film transverse direction. The film to be subjected to the thermal relaxation has preferably a thickness of 6 to 75 μm, more preferably 10 to 75 μm. Further, the film preferably has a width of i m or more. The thermal relaxation is preferably conducted using a heat-floating treatment apparatus. As the medium for heat-floating the film, a heated inert gas, particularly heated air is preferably used. By this heat-floating treatment, the thermal relaxation can be carried out effectively while the film travelling is maintained stably.

The polyester film of the present invention has a thickness of preferably 6 to 75 μm, more preferably 10 to 75 μm, particularly preferably 15 to 50 μm. When the thickness is less than 6 μm, the film tends to cause rupture, etc. during the processing. A film thickness of more than 75 μm is an excessive quality and uneconomical, and use of a film having such film thickness brings about little advantage.

As the metal sheet to be made into a can, onto which the polyester film of the present invention is to be laminated, a tinplate, a tin-free steel sheet, an aluminum sheet or the like are suitably used. The lamination of the polyester film onto the metal sheet can be conducted, for example, by the following method (a) or (b).

(a) A film is laminated onto a metal sheet which has been heated to a temperature equal to, or higher than, the melting point of the film; the laminate is rapidly cooled to make amorphous the surface layer (thin layer) of the film contacting with the metal sheet and thereby, tight adhesion is achieved.

(b). A film is beforehand coated with an adhesive as a primer to form an adhesive layer thereon and the adhesive layer surface of the film is laminated with a metal sheet. As the adhesive, there can be used a known resin adhesive such as epoxy adhesive, epoxy-ester adhesive, alkyd adhesive or the like.

The polyester film of the present invention has excellent advantages when it is laminated onto a metal sheet and the laminate is subjected to processing for can manufacturing, particularly deep drawing, to use the resulting product as a can for foods or drinks. In the polyester film of the present invention, the physical properties before the film is laminated onto a metal sheet satisfy the above-mentioned requirements (i) to (iv), particularly preferably the requirements (i) to (vii).

The polyester film of the present invention further satisfies the following requirements when measured by the following test methods. These test methods are for measuring various performances of the film which has been laminated onto a metal sheet and the laminate has been processed under the conditions similar to those for deep drawing:

(viii) Deep Drawability-2

This is the examination result of a state of pinhole-like cracks present on the surface of a film, in a test for the rust prevention of the can inside surface of a manufactured can, which was measured in accordance with a test method described later. The polyester film of the present invention exhibits a deep drawability-2 of, on an average, 0.1 mA or less, preferably 0.05 mA or less.

(ix) Resistance to Crack by Impact

This is the examination result of film cracking in a dropping test of a can product filled with water, measured in accordance with a test method described later. The polyester film of the present invention exhibits a resistance to crack by impact, of, on an average, 0.1 mA or less, preferably, 0.05 mA or less.

(x) Resistance to Embrittlement Under Heat

This is the examination result of resistance to crack by impact after a manufactured can has been heated under given conditions, measured by a test method described later. The polyester film of the present invention exhibits a resistance to embrittlement under heat, of 0.1 mA or less, preferably 0.05 mA or less.

Effects of the Invention

The polyester film of the present invention, when laminated onto a metal sheet and then subjected to processing for can manufacturing, particularly deep drawing to make a metal can, has excellent laminatability and deep drawability. Further, the product from the film has excellent properties such as impact resistance and heat resistance. Thus, the present film is very useful and of great value as a polyester film for metal containers, particularly cans manufactured by deep drawing.

EXAMPLES

The present invention will be explained more specifically by referring to Examples.

Example I

Polyester compositions were prepared by mixing a polyethylene terephthalate-based copolyester (intrinsic viscosity =0.60) (component A) in which a component shown in Table 1 has been copolymerized, and which contained 0.24 by weight of a bulk silica having an average particle diameter of 1.5 μm (particle diameter ratio =1.5, relative standard deviation = 0.8), and a polybutylene terephthalate-based copolyester in which a component shown in Table 1 has been copolymerized or a polybutylene terephthalate (component B), in the proportions shown in Table 1. Each of the polyester compositions was melt-extruded at 280° C. and solidified by rapid cooling to obtain an unstretched film.

Then, the unstretched films were subjected to longitudinal stretching, transverse stretching and thermosetting in this order under the conditions shown in Table 1 to obtain biaxially oriented films having a thickness of 25 μm. The properties of the films are shown in Table 3.

and cut into a disc of 150 mm in diameter. The disc was subjected to four-stage deep drawing using a drawing die and a punch to prepare a container of 55 mm in diameter having a seamless side (hereinafter abbreviated to can).

The cans were subjected to the following observations and tests and evaluated according to the following criteria.

(1) Laminatability
○: No wrinkle and laminatable.
Δ: Striking shrinkage in width during lamination.
X: Wrinkles are formed during lamination.

(2) Deep drawability-1
○: The films at the inside and outside surfaces of can were processed with no abnormality and showed neither whitening nor rupture.
Δ: Whitening was observed about the films at the upper portion of the inside and outside surfaces of can.
X: The films at the inside and outside surfaces of can showed partial rupture.

(3) Deep drawability-2
⊚: The films at the inside and outside surfaces of can were processed with no abnormality and the

TABLE 1

| | Component A | | Component B | | Conditions of longitudinal stretching | | Conditions of transverse stretching | | Temperature of thermosetting (°C.) |
|---|---|---|---|---|---|---|---|---|---|
| | Copolymer component | wt. % | Copolymer component | wt. % | Temp. (°C.) | Ratio | Temp. (°C.) | Ratio | |
| Example I-(1) | Isophthalic acid 12 mole % | 75 | None | 25 | 90 | 3.0 | 100 | 3.1 | 180 |
| Example I-(2) | Sebacic acid 12 mole % | 85 | None | 15 | 85 | 3.0 | 95 | 3.1 | 180 |
| Example I-(3) | Isophthalic acid 9 mole % | 85 | Isophthalic acid 5 mole % | 15 | 100 | 3.1 | 110 | 3.2 | 190 |
| Example I-(4) | Sebacic acid 9 mole % | 90 | Isophthalic acid 10 mole % | 10 | 90 | 3.1 | 100 | 3.2 | 200 |
| Example I-(5) | Isophthalic acid 6 mole % | 60 | None | 40 | 90 | 3.0 | 100 | 3.1 | 180 |

Example II and Comparative Example 1

Each of the same polyester compositions as in Example I-(1) with the exception that it contained a lubricant shown in the following Table 2, in place of the lubricant in Example 1, was melt-extruded at 280° C. and solidified by rapid cooling to prepare unstretched films. Thereafter, the unstretched films were subjected to successive biaxial stretching at a longitudinal stretching temperature of 90° C., at a longitudinal stretch ratio of 3.0, at a transverse stretching temperature of 100° C., and at a transverse stretch ratio of 3.1, and then to thermosetting at 190° C. The properties of the resulting biaxially oriented films are shown in Table 3.

TABLE 2

| | Kind of lubricant | Average particle diameter (μm) | Amount used (%) |
|---|---|---|---|
| Example II | Titanium dioxide | 0.3 | 0.3 |
| Comparative Example 1 | Bulk silica | 2.7 | 0.05 |

Each of the seven kinds of films obtained in Examples I and II and Comparative Example 1 was laminated onto the both sides of a 0.25 mm thick tin-free steel sheet heated at 230° C. Each laminate was cooled with water measured value in a rust prevention test about the film surface inside the can (a 1% aqueous NaCl solution was placed in a can to be tested; an electrode was inserted thereinto to make the can body an anode; when a voltage of 6 V was applied, an electric current value was measured. This test is hereinafter referred to as ERV test) was 0.05 mA or less.

○: The electric current in the ERV test was 0.05 to 0.1 mA.
X: The films at the inside and outside surfaces of can showed no abnormality, but the electric current in the ERV test was 0.1 mA or more and, when the portions through which electricity had passed were observed under magnification, pinhole-like cracks starting at coarse lubricant particles were observed in the sample film.

(4) Resistance to crack by impact

Cans manufactured in good deep drawability were fully filled with water, and each group consisting of ten cans for each test was dropped on a floor made of a metal sheet from a height of 30 cm. Then, each of the resulting cans was subjected to the ERV test and the results were evaluated as follows.

⊚: The average of 10 cans was less than 0.05 mA.
○: The average of 10 cans was 0.05 to 0.1 mA.
Δ: The average of 10 cans was more than 0.1 mA.

X: The average of 10 cans was more than 0.1 mA, or cracks were already observed on the film after the dropping.

(5) Resistance to embrittlement under heat

Each of 10 cans formed in good deep drawability was heated at 200° C. for 5 minutes and then evaluated for their crack resistance by impact in the manner as in the above (4).

⊚: The average of 10 cans was less than 0.05 mA.
◯: The average of 10 cans was 0.05 to 0.1 mA.
Δ: The average of 10 cans was more than 0.1 mA.
X: The average of 10 cans was more than 0.1 mA, or cracks were already observed on the film after the dropping.

The evaluation results of the above (1) to (5) are shown in Table 3.

Example III and Comparative Examples 2 to 5

Unstretched films were obtained by mixing a copolyester (component A) having an ethylene terephthalate unit as the main recurring unit, in which a component shown in Table 4 has been copolymerized and which contained 0.1% by weight of a spherical monodisperse silica having an average particle diameter of 1.5 μm (particle diameter ratio = 1.07, relative standard deviation = 0.1), and a polybutylene terephthalate (hereinafter abbreviated to PBT) or a copolyester having a butylene terephthalate unit as the main recurring unit, in which a component shown in Table 4 has been copolymerized (component B), in the proportions shown in Table 4, melt-extruding the mixtures at 280° C. and solidifying the extrudates by rapid cooling.

TABLE 3

|  | Component A Melting point of copolyester (I) (°C.) | Component B Melting point of polyester (II) (°C.) | Plane orientation coefficient $N_S$ | Heat shrinkage in longitudinal direction (%) | Density (g/cm³) |
|---|---|---|---|---|---|
| Example I-(1) | 229 | 223 | 0.095 | 3.5 | 1.363 |
| Example I-(2) | 229 | 223 | 0.098 | 2.7 | 1.372 |
| Example I-(3) | 235 | 214 | 0.121 | 3.5 | 1.375 |
| Example I-(4) | 235 | 205 | 0.118 | 2.2 | 1.377 |
| Example I-(5) | 241 | 223 | 0.135 | 3.0 | 1.352 |
| Example II | 229 | 223 | 0.145 | 3.5 | 1.365 |
| Comparative Example 1 | 229 | 223 | 0.145 | 3.5 | 1.364 |

|  | Laminatability | Deep drawability (1) | Deep drawability (2) | Resistance to crack by impact | Resistance to embrittlement under heat | Overall rating |
|---|---|---|---|---|---|---|
| Example I-(1) | ◯ | ◯ | ◯ | ◯ | ◯ | ◯ |
| Example I-(2) | ◯ | ◯ | ◯ | ◯ | ◯ | ◯ |
| Example I-(3) | ◯ | ◯ | ◯ | ◯ | ◯ | ◯ |
| Example I-(4) | ◯ | ◯ | ◯ | ◯ | ◯ | ◯ |
| Example I-(5) | ◯ | ◯ | ◯ | ◯ | ◯ | ◯ |
| Example II | ◯ | ◯ | ◯ | ◯ | ◯ | ◯ |
| Comparative Example 1 | ◯ | ◯ | X | X | X | X |

As appreciated from the results shown in Table 3, the films of Examples according to the present invention are excellent in all of deep drawability, resistance to crack by impact and heat resistance.

Then, the unstretched films were subjected to longitudinal stretching, transverse stretching and thermosetting in this order to obtain biaxially oriented films each of 25 μm in thickness.

TABLE 4

|  | Component A | | | | Component B | | | |
|---|---|---|---|---|---|---|---|---|
|  | Composition | Melting point (°C.) | Intrinsic viscosity | wt. % | Composition | Melting point (°C.) | Intrinsic viscosity | wt. % |
| Example III-(1) | SA 9 mole % | 235 | 0.69 | 99 | PBT | 223 | 0.89 | 1 |
| Example III-(2) | SA 9 mole % | 235 | 0.69 | 90 | IA 10 mole % | 205 | 0.95 | 10 |
| Example III-(3) | SA 12 mole % | 229 | 0.71 | 85 | PBT | 223 | 0.89 | 15 |
| Example III-(4) | IA 9 mole % | 235 | 0.70 | 85 | IA 5 mole % | 214 | 0.93 | 15 |
| Example III-(5) | IA 12 mole % | 229 | 0.70 | 75 | PBT | 223 | 0.89 | 25 |
| Example III-(6) | IA 6 mole % | 241 | 0.68 | 60 | PBT | 223 | 0.89 | 40 |
| Comparative Example 2 | IA 9 mole % | 235 | 0.70 | 55 | PBT | 223 | 0.89 | 45 |
| Comparative Example 3 | IA 3 mole % | 247 | 0.71 | 85 | PBT | 223 | 0.89 | 15 |
| Comparative Example 4 | IA 22 mole % | 208 | 0.70 | 85 | PBT | 223 | 0.89 | 15 |
| Comparative Example 5 | SA 9 mole % | 235 | 0.70 | 85 | IA 25 mole % | 178 | 0.89 | 15 |

| Conditions of longitudinal | Conditions of transverse | Thermosetting |
|---|---|---|

TABLE 4-continued

|  | stretching | | stretching | | temperature |
|---|---|---|---|---|---|
|  | Temp. (°C.) | Ratio | Temp. (°C.) | Ratio | (°C.) |
| Example VI-(1) | 85 | 2.8 | 100 | 3.0 | 200 |
| Example VI-(2) | 90 | 3.1 | 100 | 3.2 | 200 |
| Example VI-(3) | 85 | 3.0 | 95 | 3.1 | 180 |
| Example VI-(4) | 100 | 3.1 | 110 | 3.2 | 190 |
| Example VI-(5) | 90 | 3.0 | 100 | 3.1 | 180 |
| Example VI-(6) | 90 | 3.0 | 100 | 3.1 | 180 |
| Comparative Example 2 | 85 | 3.0 | 100 | 3.1 | 170 |
| Comparative Example 3 | 95 | 3.0 | 100 | 3.0 | 180 |
| Comparative Example 4 | 95 | 3.0 | 100 | 3.1 | 170 |
| Comparative Example 5 | 95 | 3.1 | 105 | 3.0 | 180 |

Note
PET: polyethylene terephthalate
PBT: polybutylene terephthalate
IA: Isophthalic acid
SA: sebacic acid The plane orientation coefficients, heat shrinkages and densities of these films are shown in Table 5.

TABLE 5

|  | Plane orientation coefficient | Thermal shrinkage in longitudinal direction (150° C.) (%) | Density (g/cm³) |
|---|---|---|---|
| Example III-(1) | 0.145 | 2.5 | 1.395 |
| Example III-(2) | 0.119 | 2.4 | 1.375 |
| Example III-(3) | 0.097 | 2.7 | 1.370 |
| Example III-(4) | 0.120 | 3.6 | 1.374 |
| Example III-(5) | 0.097 | 3.5 | 1.362 |
| Example III-(6) | 0.134 | 3.1 | 1.350 |
| Comparative Example 2 | 0.145 | 2.6 | 1.345 |
| Comparative Example 3 | 0.165 | 2.7 | 1.388 |
| Comparative Example 4 | 0.075 | 3.5 | 1.375 |
| Comparative Example 5 | 0.125 | 3.2 | 1.382 |

Comparative Examples 6 to 8

The unstretched film obtained in Example III-(5) was subjected to longitudinal stretching, transverse stretching and thermosetting in this order under the conditions shown in Table 6 to obtain biaxially oriented films.

TABLE 6

|  | Conditions of longitudinal stretching | | Conditions of transverse stretching | | Temperature of thermosetting (°C.) |
|---|---|---|---|---|---|
|  | Temp. (°C.) | Ratio | Temp. (°C.) | Ratio |  |
| Comparative Example 6 | 100 | 2.5 | 100 | 2.5 | 180 |
| Comparative Example 7 | 100 | 3.3 | 100 | 3.3 | 150 |
| Comparative Example 8 | 100 | 3.0 | 100 | 3.0 | 205 |

TABLE 6-continued

|  | Conditions of longitudinal stretching | | Conditions of transverse stretching | | Temperature of thermosetting (°C.) |
|---|---|---|---|---|---|
|  | Temp. (°C.) | Ratio | Temp. (°C.) | Ratio |  |
| Example 8 |  |  |  |  |  |

The plane orientation coefficients, heat shrinkages and densities of these films are shown in Table 7.

TABLE 7

|  | Plane orientation coefficient | Thermal shrinkage in longitudinal direction (150° C.) (%) | Density (g/cm³) |
|---|---|---|---|
| Comparative Example 6 | 0.076 | 2.5 | 1.364 |
| Comparative Example 7 | 0.162 | 11.0 | 1.358 |
| Comparative Example 8 | 0.112 | 2.2 | 1.387 |

Each of the 13 kinds of films obtained in Examples III-(1) to III-(6) and Comparative Examples 2 to 8 was laminated onto the both sides of a 0.025 mm thick tin-free steel sheet heated at 230° C. Each laminate was cooled with water and cut into a disc of 150 mm in diameter. The disc was subjected to four-stage deep drawing using a drawing die and a punch to prepare containers of 55 mm in diameter having a seamless side (hereinafter abbreviated to can).

These cans were observed and tested for (1) laminatability, (2) deep drawability-1, (3) deep drawability-2, (4) resistance to crack by impact and (5) resistance to embrittlement under heat in accordance with the methods of Example I.

The evaluation results are shown in Table 8.

TABLE 8

|  | Laminatability | Deep drawability | | Resistance to crack by impact | Resistance to embrittlement under heat | Overall rating |
|---|---|---|---|---|---|---|
|  |  | (1) | (2) |  |  |  |
| Example III-(1) | ○ | ○ | ○ | ○ | ○ | ○ |
| Example III-(2) | ○ | ○ | ⊙ | ○ | ○ | ○ |
| Example III-(3) | ○ | ○ | ⊙ | ○ | ○ | ○ |
| Example III-(4) | ○ | ○ | ⊙ | ○ | ○ | ○ |
| Example III-(5) | ○ | ○ | ⊙ | ○ | ○ | ○ |
| Example III-(6) | ○ | ○ | ⊙ | ○ | ○ | ○ |

TABLE 8-continued

| | Laminatability | Deep drawability (1) | Deep drawability (2) | Resistance to crack by impact | Resistance to embrittlement under heat | Overall rating |
|---|---|---|---|---|---|---|
| Comparative Example 2 | ○ | ○ | Δ | X | X | X |
| Comparative Example 3 | ○ | X | X | X | X | X |
| Comparative Example 4 | ○ | ○ | ○ | Δ | Δ | Δ |
| Comparative Example 5 | ○ | ○ | ○ | Δ | Δ | Δ |
| Comparative Example 6 | ○ | ○ | Δ | X | X | X |
| Comparative Example 7 | X | X | X | X | X | X |
| Comparative Example 8 | ○ | ○ | Δ | Δ | Δ | Δ |

As appreciated from the results shown in Table 8, the films of Examples of the present invention are excellent in all of laminatability, deep drawability, resistance to crack by impact and resistance to embrittlement under heat.

Example IV and Comparative Examples 9 to 12

Unstretched films were obtained by mixing a copolyester (component A) having an ethylene terephthalate unit as the main recurring unit, in which a component shown in Table 9 has been copolymerized and which contained 0.1% by weight of a spherical monodisperse silica having an average particle diameter of 1.5 μm (particle diameter ratio = 1.07, relative standard deviation = 0.1), and a PBT or a copolyester having a butylene terephthalate unit as the main recurring unit, in which a component shown in Table 9 has been copolymerized (component B), in the proportions shown in Table 9, melt-extruding the composition at 280° C. and solidifying the extrudate by rapid cooling.

TABLE 9

| | Component A | | | | Component B | | | |
|---|---|---|---|---|---|---|---|---|
| | Composition | Melting point (°C.) | Intrinsic viscosity | wt. % | Composition | Melting point (°C.) | Intrinsic viscosity | wt. % |
| Example IV-(1) | SA 9 mole % | 235 | 0.59 | 99 | PBT | 223 | 0.72 | 1 |
| Example IV-(2) | SA 9 mole % | 235 | 0.59 | 90 | IA 10 mole % | 205 | 0.75 | 10 |
| Example IV-(3) | SA 12 mole % | 229 | 0.61 | 85 | PBT | 223 | 0.72 | 15 |
| Example IV-(4) | IA 9 mole % | 235 | 0.60 | 85 | IA 5 mole % | 214 | 0.74 | 15 |
| Example IV-(5) | IA 12 mole % | 228 | 0.60 | 75 | PBT | 223 | 0.72 | 25 |
| Example IV-(6) | IA 6 mole % | 241 | 0.59 | 60 | PBT | 223 | 0.72 | 40 |
| Comparative Example 9 | IA 9 mole % | 235 | 0.60 | 55 | PBT | 223 | 0.72 | 45 |
| Comparative Example 10 | IA 3 mole % | 247 | 0.62 | 85 | PBT | 223 | 0.72 | 15 |
| Comparative Example 11 | IA 22 mole % | 208 | 0.60 | 85 | PBT | 223 | 0.72 | 15 |
| Comparative Example 12 | IA 9 mole % | 235 | 0.60 | 85 | IA 25 mole % | 178 | 0.72 | 15 |

| | Conditions of longitudinal stretching | | Conditions of transverse stretching | | Completion temp. of thermosetting (°C.) | Stretch ratio of thermosetting (%) |
|---|---|---|---|---|---|---|
| | Temp. (°C.) | Ratio | Temp.* (°C.) | Ratio | | |
| Example IV-(1) | 85 | 2.8 | 100→170 | 3.0 | 200 | 7.5 |
| Example IV-(2) | 85 | 3.1 | 95→170 | 3.2 | 200 | 7.5 |
| Example IV-(3) | 85 | 3.0 | 95→160 | 3.1 | 185 | 7.5 |
| Example IV-(4) | 95 | 3.1 | 100→170 | 3.2 | 190 | 7.5 |
| Example IV-(5) | 85 | 3.0 | 100→160 | 3.1 | 180 | 7.5 |
| Example IV-(6) | 85 | 3.0 | 100→160 | 3.1 | 180 | 7.5 |
| Comparative Example 9 | 85 | 3.0 | 100→160 | 3.1 | 170 | 10 |
| Comparative Example 10 | 95 | 3.0 | 100→170 | 3.0 | 180 | 5 |
| Comparative Example 11 | 95 | 3.0 | 100→160 | 3.1 | 170 | 5 |
| Comparative Example | 95 | 3.1 | 100→170 | 3.0 | 180 | 5 |

TABLE 9-continued

Example 12

*indicates "initiation temperature" → "completion temperature" in transverse stretching.
Note
PET: polyethylene terephthalate
PBT: polybutylene terephthalate
IA: Isophthalic acid
SA: sebacic acid Then, these unstretched films were subjected to longitudinal stretching, transverse stretching and thermosetting in this order under the conditions shown in Table 9 to obtain biaxially oriented films having a thickness of 25 μm.

The plane orientation coefficients, heat shrinkages, densities, refractive indexes in film thickness direction, refractive indexes in film plane directions and top peaks by DSC of the films are shown in Table 10.

TABLE 10

|  | Plane orientation coefficient | Heat shrinkage in longitudinal direction (150° C.) (%) | Density (g/cm³) | Refractive index in thickness direction | Refractive indexes in film plane directions max./min. | Top of peak by DSC (°C.) |
| --- | --- | --- | --- | --- | --- | --- |
| Example IV-(1) | 0.151 | 2.7 | 1.393 | 1.515 | 1.645/1.620 | 198 |
| Example IV-(2) | 0.125 | 2.6 | 1.371 | 1.520 | 1.650/1.625 | 197 |
| Example IV-(3) | 0.103 | 2.9 | 1.367 | 1.512 | 1.652/1.623 | 186 |
| Example IV-(4) | 0.126 | 3.8 | 1.371 | 1.519 | 1.654/1.625 | 191 |
| Example IV-(5) | 0.105 | 3.7 | 1.359 | 1.512 | 1.653/1.629 | 181 |
| Example IV-(6) | 0.137 | 3.3 | 1.346 | 1.524 | 1.649/1.615 | 178 |
| Comparative Example 9 | 0.152 | 2.9 | 1.341 | 1.535 | 1.647/1.613 | 167 |
| Comparative Example 10 | 0.163 | 2.9 | 1.386 | 1.512 | 1.657/1.612 | 178 |
| Comparative Example 11 | 0.078 | 3.7 | 1.372 | 1.527 | 1.667/1.608 | 168 |
| Comparative Example 12 | 0.128 | 3.5 | 1.379 | 1.538 | 1.668/1.605 | 207 |

Example V and Comparative Example 13

Biaxially oriented films were obtained in the same manner as in Example IV-(5) with the exception that lubricants shown in Table 11 were used.

TABLE 11

|  | Kind of lubricant | Average particle diameter (μm) | Amount used (%) |
| --- | --- | --- | --- |
| Example V | Titanium dioxide | 0.3 | 0.3 |
| Comparative | Bulk silica | 2.7 | 0.05 |

TABLE 11-continued

Example 13

The plane orientation coefficients, heat shrinkages, densities, refractive indexes in film thickness direction, refractive indexes in film plane directions and top peaks by DSC of the films are shown in Table 12.

TABLE 12

|  | Plane orientation coefficient | Heat shrinkage in longitudinal direction (150° C.) (%) | Density (g/cm³) | Refractive index in thickness direction | Refractive indexes in film plane directions max./min. | Top of peak by DSC (°C.) |
| --- | --- | --- | --- | --- | --- | --- |
| Example V | 0.147 | 3.7 | 1.362 | 1.521 | 1.650/1.615 | 180 |
| Comparative Example 13 | 0.148 | 3.6 | 1.361 | 1.518 | 1.649/1.616 | 182 |

Comparative Examples 14 and 15

Biaxially oriented films were obtained in the same manner as in Example IV-(5) with the exception that the thermosetting temperature was changed to 145° C. (Comparative Example 14) and 210° C. (Comparative Example 15).

The plane orientation coefficients, heat shrinkages, densities, refractive indexes in film thickness direction, refractive indexes in film plane directions and top of the peaks by DSC of the films are shown in Table 13.

TABLE 13

|  | Plane orientation coefficient | Heat shrinkage in longitudinal direction (150° C.) (%) | Density (g/cm³) | Refractive index in thickness direction | Refractive indexes in film plane directions max./min. | Top of peak by DSC (°C.) |
| --- | --- | --- | --- | --- | --- | --- |
| Example 14 | 0.115 | 15.5 | 1.345 | 1.517 | 1.643/1.625 | 146 |
| Example 15 | 0.097 | 2.1 | 1.352 | 1.525 | 1.667/1.607 | 207 |

Each of the 14 kinds of films obtained in Examples IV-(1) to IV-(6) and V and Comparative Examples 9 to 15 was laminated onto the both sides of a 0.25 mm thick tin-free steel sheet heated at 230° C. Each laminate was cooled with water and cut into a disc of 150 mm in diameter. The disc was subjected to four-stage deep drawing using a drawing die and a punch to prepare containers of 55 mm in diameter having a seamless side (hereinafter abbreviated to can).

These cans were observed and tested for (1) laminatability, (2) deep drawability-1, (3) deep drawability-2, (4) resistance to crack by impact and (5) resistance to embrittlement under heat in accordance with the methods of Example I.

The evaluation results are shown in Table 14.

Example VI

Unstretched films were obtained by mixing a copolyester (component A) having an ethylene terephthalate unit as the main recurring unit, in which a component shown in Table 15 has been copolymerized and which contained 0.1% by weight of a spherical monodisperse silica having an average particle diameter of 1.5 μm (particle diameter ratio =1.07, relative standard deviation =0.1), and a PBT or a copolyester having a butylene terephthalate unit as the main recurring unit, in which a component shown in Table 15 has been copolymerized (component B), in the proportions shown in

TABLE 14

|  | Laminatability | Deep drawability (1) | Deep drawability (2) | Resistance to crack by impact | Resistance to embrittlement under heat | Overall rating |
| --- | --- | --- | --- | --- | --- | --- |
| Example IV-(1) | ○ | ○ | ○ | ○ | ○ | ○ |
| Example IV-(2) | ○ | ○ | ⊙ | ⊙ | ○ | ○ |
| Example IV-(3) | ○ | ○ | ⊙ | ⊙ | ○ | ○ |
| Example IV-(4) | ○ | ○ | ⊙ | ⊙ | ○ | ○ |
| Example IV-(5) | ○ | ○ | ⊙ | ⊙ | ○ | ○ |
| Example IV-(6) | ○ | ○ | ⊙ | ⊙ | ○ | ○ |
| Example V | ○ | ○ | ○ | ○ | ○ | ○ |
| Comparative Example 9 | ○ | ○ | Δ | X | X | X |
| Comparative Example 10 | ○ | X | X | X | X | X |
| Comparative Example 11 | ○ | ○ | ○ | Δ | X | X |
| Comparative Example 12 | ○ | ○ | ○ | Δ | X | X |
| Comparative Example 13 | ○ | ○ | X | Not measured | Not measured | X |
| Comparative Example 14 | X | X | X | X | X | X |
| Comparative Example 15 | ○ | ○ | ○ | Δ | Δ | Δ |

As appreciated from the results shown in Table 14, the films of Examples of the present invention are excellent in all of laminatability, deep drawability, resistance to crack by impact and resistance to embrittlement under heat.

Table 15, melt-extruding the mixture at 280° C. and solidifying the extrudate by rapid cooling.

These unstretched films were subjected to longitudinal stretching, transverse stretching and thermosetting in this order under the conditions shown in Table 15 to obtain biaxially oriented films having a thickness of 25 μm.

TABLE 15

| | Component A | | | | Component B | | | |
| --- | --- | --- | --- | --- | --- | --- | --- | --- |
| | Composition | Melting point (°C.) | Intrinsic viscosity | wt. % | Composition | Melting point (°C.) | Intrinsic viscosity | wt. % |
| Example VI-(1) | SA 9 mole % | 235 | 0.65 | 99 | PBT | 223 | 0.89 | 1 |
| Example VI-(2) | SA 9 mole % | 235 | 0.65 | 90 | IA 10 mole % | 205 | 0.95 | 10 |
| Example VI-(3) | SA 12 mole % | 229 | 0.64 | 85 | PBT | 223 | 0.89 | 15 |
| Example VI-(4) | IA 9 mole % | 235 | 0.65 | 85 | IA 5 mole % | 214 | 0.93 | 15 |
| Example VI-(5) | IA 12 mole % | 229 | 0.65 | 75 | PBT | 223 | 0.89 | 25 |
| Example VI-(6) | IA 6 mole % | 241 | 0.66 | 60 | PBT | 223 | 0.89 | 40 |

| | Conditions of longitudinal stretching | | Conditions of transverse stretching | | Thermosetting temperature (°C.) |
| --- | --- | --- | --- | --- | --- |
| | Temp. (°C.) | Ratio | Temp.* (°C.) | Ratio | |
| Example VI-(1) | 120 | 3.0 | 120 | 3.2 | 200 |
| Example VI-(2) | 115 | 3.1 | 115 | 3.1 | 200 |
| Example VI-(3) | 115 | 3.0 | 115 | 3.2 | 180 |
| Example VI-(4) | 115 | 3.1 | 115 | 3.1 | 190 |
| Example VI-(5) | 110 | 3.0 | 110 | 3.1 | 180 |

TABLE 15-continued

| Example VI-(6) | 100 | 3.0 | 100 | 3.1 | 180 |

Note
PET: polyethylene terephthalate
PBT: polybutylene terephthalate
IA: Isophthalic acid
SA: sebacic acid The plane orientation coefficients, heat shrinkages, densities and proportions of protrusions each having a hollow, of the films are shown in Table 16.

TABLE 16

|  | Plane orientation coefficient | Heat shrinkage in longitudinal direction (150° C.) (%) | Density (g/cm$^3$) | Preparation of protrusions each having a hollow |
|---|---|---|---|---|
| Example VI-(1) | 0.125 | 2.3 | 1.393 | 0.2 |
| Example VI-(2) | 0.107 | 2.3 | 1.372 | 0.3 |
| Example VI-(3) | 0.085 | 2.6 | 1.368 | 0.3 |
| Example VI-(4) | 0.105 | 3.3 | 1.372 | 0.5 |
| Example VI-(5) | 0.088 | 3.2 | 1.360 | 0.2 |
| Example VI-(6) | 0.121 | 3.0 | 1.348 | 0.1 |

Each of the 6 kinds of films obtained in Example VI was laminated onto the both sides of a 0.25 mm thick tin-free steel sheet heated at 230° C. Each laminate was cooled with water and cut into a disc of 150 mm in diameter. The disc was subjected to four-stage deep drawing using a drawing die and a punch to prepare containers of 55 mm in diameter having a seamless side (hereinafter abbreviated to can).

These cans were observed and tested for (1) laminatability, (2) deep drawability-1, (3) deep drawability-2, (4) resistance to crack by impact and (5) resistance to embrittlement under heat in accordance with the methods of Example I. The evaluation results are shown in Table 17.

TABLE 17

|  | Laminatability | Deep drawability (1) | Deep drawability (2) | Impact crack resistance | Thermal embrittlement resistance | Overall rating |
|---|---|---|---|---|---|---|
| Example VI-(1) | ◯ | ◯ | ◯ | ◯ | ◯ | ◯ |
| Example VI-(2) | ◯ | ◯ | ⊙ | ⊙ | ⊙ | ⊙ |
| Example VI-(3) | ◯ | ◯ | ⊙ | ⊙ | ⊙ | ⊙ |
| Example VI-(4) | ◯ | ◯ | ⊙ | ⊙ | ⊙ | ⊙ |
| Example VI-(5) | ◯ | ◯ | ⊙ | ⊙ | ⊙ | ⊙ |
| Example VI-(6) | ◯ | ◯ | ⊙ | ⊙ | ⊙ | ⊙ |

As appreciated from the results shown in Table 17, the films of Example of the present invention are excellent in all of laminatability, deep drawability, resistance to crack by impact and resistance to embrittlement under heat.

We claim:

1. A polyester film for lamination onto a metal sheet formed substantially from a composition comprising a molten mixture of component (A) 99 to 60% by weight of a copolyethylene terephthalate having an ethylene terephthalate unit as the main recurring unit and having a melting point of 210 to 245° C., and component (B) 1 to 40% by weight of a polybutylene terephthalate or a copolybutylene terephthalate having a butylene terephthalate unit as the main recurring unit and having a melting point of 180 to 223° C., and component C, a lubricant having an average particle diameter of 2.5 μm or less, wherein the lubricant is a sperical mono-dispersed lubricant having a long diameter ratio to short diameter ratio of 1.0 to 1.2, and wherein the film (i) has a plane orientation coefficient of 0.08 to 0.16, (ii) has a heat shrinkage at 150° C. of 10% or less, and (iii) has a density of less than 1.385 g/cm$^3$.

2. The polyester film set forth in claim 1, wherein the film (iv) has protrusions on the film surface so as to satisfy the following expression $$0.1 \leq Nd/N \leq 0.5$$

wherein N is the number of total protrusions per unit area of the film surface and Nd is the number of protrusions each containing said lubricant as the nucleus and having a sunk hollow around it, per unit area of the film surface.

3. The polyester film set forth in claim 1 or 2, (v) having a refractive index of 1,505 to 1.545 in the thickness direction of the film, (vi) having refractive indexes of 1.61 to 1.66 in all the plane directions of the film, and (vii) giving a top of the endothermic peak corresponding neither to the component A nor to the component B in DSC curve, in the range of 150 to 205° C.

4. The polyester film set forth in any of claims 1 or 2, wherein the copolyethylene terephthalate has a melting point of 215 to 240° C.

5. The polyester film of claim 1 or 2 wherein the component (B) polybutylene terephthalate or the copolybutylene terephthalate has a melting point of 200 to 223° C.

6. The polyester film of claim 1 or 2 wherein the proportion of the component A polyethylene terephthalate to the component (B) terephthalate or the copolybutylene terephthalate is 95:5 to 60:40.

7. The polyester film of claim 1 or 2, which (i) has a plane orientation coefficient of 0.09 to 0.15, (ii) has a heat shrinkage at 150° C. of 7% or less, and (iii) has a density of 1.380 to 1.350 g/cm$^3$.

8. The polyester film set forth in claim 1 or 2

(v) having a refractive index of 1.510 to 1,540 in the thickness direction of the film, (vi) having refractive indexes of 1,615 to 1,655 in all the plane directions of the film, and (vii) giving a top of the endothermic peak corresponding neither to the component A nor to the component B in DSC curve, in the range of 150 to 205° C.

9. The polyester film of claim 1 or 2, which shows a deep drawability-2 of 0.1 mA or less when subjected to deep drawing.

10. The polyester film of claim 1 or 2, which shows the resistance to crack by impact, of 0.1 mA or less when subjected to deep drawing.

11. The polyester film of claim 1 or 2, which shows the resistance to embrittlement under heat, of 0.1 mA or less when subjected to deep drawing.

* * * * *